(12) United States Patent
Matsuno et al.

(10) Patent No.: US 12,459,521 B2
(45) Date of Patent: Nov. 4, 2025

(54) DRIVING ABILITY DETERMINATION SYSTEM AND DRIVING ABILITY DETERMINATION METHOD

(71) Applicant: Honda Motor Co., Ltd., Tokyo (JP)

(72) Inventors: Toshifumi Matsuno, Tokyo (JP); Taiki Iwama, Tokyo (JP); Daisuke Ide, Tokyo (JP); Shinichiro Goto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 18/284,118

(22) PCT Filed: Oct. 15, 2021

(86) PCT No.: PCT/JP2021/038220
§ 371 (c)(1),
(2) Date: Sep. 26, 2023

(87) PCT Pub. No.: WO2022/208954
PCT Pub. Date: Oct. 6, 2022

(65) Prior Publication Data
US 2024/0157949 A1    May 16, 2024

(30) Foreign Application Priority Data

Mar. 30, 2021    (JP) ................. 2021/056571

(51) Int. Cl.
*B60W 40/09*    (2012.01)
*B60W 30/18*    (2012.01)
*B60W 50/14*    (2020.01)

(52) U.S. Cl.
CPC ...... *B60W 40/09* (2013.01); *B60W 30/18159* (2020.02); *B60W 50/14* (2013.01); *B60W 2540/22* (2013.01)

(58) Field of Classification Search
CPC ................. B60W 50/14; B60W 40/09; B60W 2520/105; B60W 2520/26; B60W 2554/802
See application file for complete search history.

(56) References Cited

U.S. PATENT DOCUMENTS

2021/0394776 A1    12/2021    Okamoto et al.

FOREIGN PATENT DOCUMENTS

| JP | 2013199222 A | 10/2013 |
| JP | 2014174848 A | 9/2014 |

(Continued)

OTHER PUBLICATIONS

International Search Report; Application PCT/JP2021/038220; Dec. 28, 2021.
Japanese office action; Application 2023-510198; Sep. 10, 2024.

*Primary Examiner* — Brian A Zimmerman
*Assistant Examiner* — Cal J Eustaquio
(74) *Attorney, Agent, or Firm* — Duft & Bornsen, PC

(57) ABSTRACT

A driving ability determination system, includes: an acquisition unit configured to acquire travel data of a vehicle; a first calculation unit configured to calculate a first evaluation value indicating characteristics of steering by a driver of the vehicle based on the travel data acquired by the acquisition unit; and a second calculation unit configured to calculate a second evaluation value indicating characteristics of steering by the driver of the vehicle based on travel data in a first section among pieces of the travel data acquired by the acquisition unit. The first calculation unit calculates the first evaluation value based on the travel data in the first section and travel data in a second section different from the first section among pieces of the travel data acquired by the acquisition unit.

14 Claims, 5 Drawing Sheets

| | SECTION | DRIVING LOAD | α VALUE | Hp VALUE |
|---|---|---|---|---|
| NO-LOAD/ LOW-LOAD SECTION | STRAIGHT LINE | NO-LOAD | USED | |
| | RIGHT CURVE | LOW-LOAD | | |
| | LEFT CURVE | | | |
| | LANE CHANGE | | | |
| | RIGHT TURN | | | USED |
| | LEFT TURN | | | |
| HIGH-LOAD SECTION | S-SHAPED CURVE | HIGH-LOAD | | |
| | CRANK | | | |
| | PARKING | | | |

(56) References Cited

FOREIGN PATENT DOCUMENTS

| | | | |
|---|---|---|---|
| JP | 2015219830 | A | 12/2015 |
| JP | 2018176913 | A | 11/2018 |
| JP | 2020159831 | A | 10/2020 |
| WO | 2020105094 | A1 | 5/2020 |

FIG. 1

| | SECTION | DRIVING LOAD | α VALUE | Hp VALUE |
|---|---|---|---|---|
| NO-LOAD/ LOW-LOAD SECTION | STRAIGHT LINE | NO-LOAD | USED | |
| | RIGHT CURVE | LOW-LOAD | | |
| | LEFT CURVE | | | |
| | LANE CHANGE | | | |
| | RIGHT TURN | | | USED |
| | LEFT TURN | | | |
| HIGH-LOAD SECTION | S-SHAPED CURVE | HIGH-LOAD | | |
| | CRANK | | | |
| | PARKING | | | |

DRIVING ABILITY DETERMINATION SYSTEM AND DRIVING ABILITY DETERMINATION METHOD

CROSS-REFERENCE TO RELATED APPLICATION

This application is a National Stage of PCT international application Ser. No. PCT/JP2021/038220 filed on Oct. 15, 2021 which designates the United States, incorporated herein by reference, and which is based upon and claims the benefit of priority from Japanese Patent Application No. 2021-056571 filed on Mar. 30, 2021, the entire contents of which are incorporated herein by reference.

TECHNICAL FIELD

The present invention relates to a driving ability determination system and a driving ability determination method that determine a driving ability of a driver of a vehicle.

BACKGROUND ART

As this type of device, there has been conventionally known a device that measures a safe driving ability of a driver (see, for example, Patent Literature 1). In the device described in Patent Literature 1, a load is applied to a driver to disperse attention by intermittently outputting sound, steering entropy values indicating shaking of steering in a load state and a no-load state are calculated, and a safe driving ability of the driver is evaluated based on a difference between shaking evaluation values calculated in the load state and the no-load state.

CITATION LIST

Patent Literature

Patent Literature 1: Japanese Unexamined Patent Publication No. 2014-174848

SUMMARY OF INVENTION

Technical Problem

However, in the device described in Patent Literature 1, it is necessary to apply a load to a driver in order to evaluate a safe driving ability of the driver, which hinders driving.

Solution to Problem

An aspect of the present invention is a driving ability determination system, including: an acquisition unit configured to acquire travel data of a vehicle; a first calculation unit configured to calculate a first evaluation value indicating characteristics of steering by a driver of the vehicle based on the travel data acquired by the acquisition unit; and a second calculation unit configured to calculate a second evaluation value indicating characteristics of steering by the driver of the vehicle based on travel data in a first section among pieces of the travel data acquired by the acquisition unit. The first calculation unit calculates the first evaluation value based on the travel data in the first section and travel data in a second section different from the first section among pieces of the travel data acquired by the acquisition unit.

Another aspect of the present invention is a driving ability determination method, including the steps of: acquiring travel data of a vehicle; calculating a first evaluation value indicating characteristics of steering by a driver of the vehicle based on the travel data acquired in the acquiring; and calculating a second evaluation value indicating characteristics of steering by the driver of the vehicle based on travel data in a first section among pieces of the travel data acquired in the acquiring. The calculating first evaluation value includes calculating the first evaluation value based on the travel data in the first section and travel data in a second section different from the first section among pieces of the travel data acquired in the acquiring.

Advantageous Effects of the Invention

According to the present invention, it becomes possible to determine the driving ability without hindering driving.

BRIEF DESCRIPTION OF DRAWINGS

FIG. 1 is a diagram for explaining a travel section and a driving load.

DESCRIPTION OF EMBODIMENT

Figure 2:
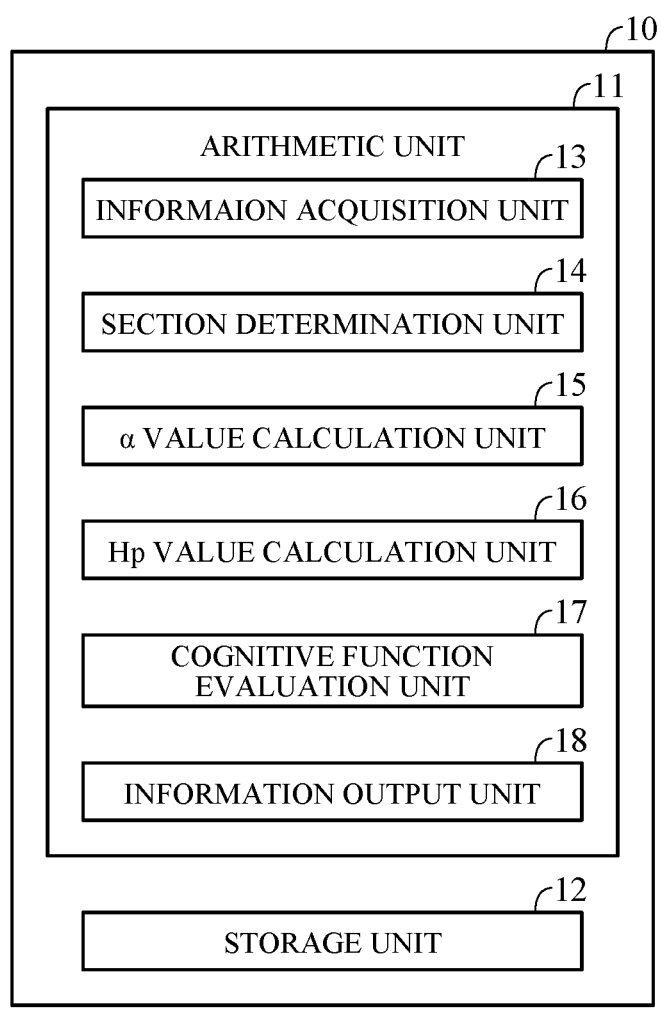
FIG. 2 is a block diagram exemplifying a main configuration of a driving ability determination system according to an embodiment of the present invention.

Hereinafter, an embodiment of the present invention will be described with reference to FIGS. 1 to 5. A driving ability determination system according to the embodiment of the present invention determines a driving ability of a driver of a vehicle. Generally, a driving behavior of the driver includes three elements of cognition, judgment, and operation. It is known that an ability related to a "cognitive function", which is an intelligent function of a person related to the cognition and the judgment among the three elements, gradually decreases as the person gets older. The decrease in cognitive function makes it difficult to safely drive the vehicle.

Therefore, in the present embodiment, a driving ability determination system is configured as follows such that a driving ability, particularly a driving ability related to a cognitive function is determined based on travel data obtained when a driver drives a vehicle, and the driver himself/herself or his/her family grasps that the cognitive function of the driver tends to decrease to support safe driving.

FIG. 1 is a diagram for explaining a travel section and a driving load. As illustrated in FIG. 1, the travel section in which a vehicle travels can be classified into a no-load section with almost no driving load applied to a driver by a driving behavior, such as a straight line, a high-load section with a large driving load, such as an S-shaped curve, a crank, or parking, and a low-load section in the middle between the no-load section and the high-load section. More specifically, the no-load section is a travel section in which the driver is required to steer the vehicle in a small amount relative to a movement amount and a travel track of the vehicle forms a simple shape, and the high-load section is a section in which the driver is required to steer the vehicle in a large amount relative to a movement amount and a travel track of the vehicle forms a complicated shape. In such a high-load section, a high driving skill is required because steering is required very frequently, it is necessary to operate the steering in conjunction with an operation of an accelerator or a brake, and a sense of vehicle is also required. That is, a driver's driving skill largely affects driving stability in the high-load section.

The low-load section includes a travel section such as a right curve, a left curve, a lane change, a right turn, or a left turn. Among these low-load sections, in a section in which a traveling direction of the vehicle is changed by crossing an opposite lane at an intersection (a right turn section in a country or a region where left-hand traffic of the vehicle is adopted, and a left turn section in a country or a region where right-hand traffic is adopted, hereinafter, simply referred to as a "right turn section"), when the driver recognizes a target track of the vehicle, it is necessary to grasp a situation of a travel lane after turning right while grasping a situation of the opposite lane ahead. In this case, a shift of a line of sight between the opposite lane ahead and the travel lane after turning right increases the driver's mental activity and a driving load, particularly a cognitive load related to cognition increases as compared with that in the other low-load sections. For this reason, the cognitive function of the driver largely affects driving stability in the right turn section. By evaluating driving stability based on such travel data in the right turn section, it is possible to determine a driving ability related to a cognitive function of the driver.

Examples of the travel section in which the cognitive function of the driver affects driving stability include, in addition to the right turn section, a section in which the number of times a line of sight shifts is larger than a predetermined number, such as a section in which many signs are disposed or a two-way traffic section, a section in which a traffic light is disposed, a section in which the number of pedestrians is larger than a predetermined number, such as a downtown, a section in which the number of blind spots during driving is larger than a predetermined number, such as an intersection with poor visibility, and a section in which a plurality of roads intersect. Therefore, the driving ability related to the cognitive function of the driver can also be determined by acquiring travel data in such a section in such a manner as to be distinguishable from that in another section and evaluating driving stability based on the acquired travel data. When time-series position information is acquired in addition to the travel data of the vehicle, a specific preset travel section can be identified based on the position information.

FIG. 2 is a block diagram illustrating a main configuration of a driving ability determination system (hereinafter, system) 10. As illustrated in FIG. 2, the system 10 includes a computer including an arithmetic unit 11 such as a CPU, a storage unit 12 such as a ROM or a RAM, and peripheral circuits thereof. The arithmetic unit 11 includes, as functional components, an information acquisition unit 13, a section determination unit 14, an α value calculation unit 15, an Hp value calculation unit 16, a cognitive function evaluation unit 17, and an information output unit 18. The storage unit 12 stores a program to be executed by the arithmetic unit 11 and information such as a setting value. The system 10 may be configured as an in-vehicle device mounted on a vehicle, or may be configured as a server device or the like disposed outside the vehicle.

The information acquisition unit 13 acquires travel data of a vehicle for each driver. For example, travel data measured with a dedicated vehicle for an elderly person's lecture at the time of the elderly person's lecture and travel data measured with a vehicle that a driver drives on a routine basis are acquired. The travel data includes at least time-series information on a steering angle θ of the vehicle. The travel data may include time-series position information and the like. The information acquisition unit 13 may acquire information regarding a result of a cognitive function test at the time of the elderly person's lecture in addition to the travel data at the time of the elderly person's lecture.

The section determination unit 14 determines a travel section based on the travel data acquired by the information acquisition unit 13. More specifically, the section determination unit 14 determines whether the travel section for each unit time is the no-load/low-load section or the high-load section in FIG. 1 based on a time change in the steering angle θ, and determines whether or not the travel section is a right turn section in the no-load/low-load section. The section determination unit 14 may determine the travel section for each unit time based on a time change in the position information. Note that when the travel data for each travel section is acquired by the information acquisition unit 13, the section determination unit 14 does not need to determine the travel section.

Figure 3:
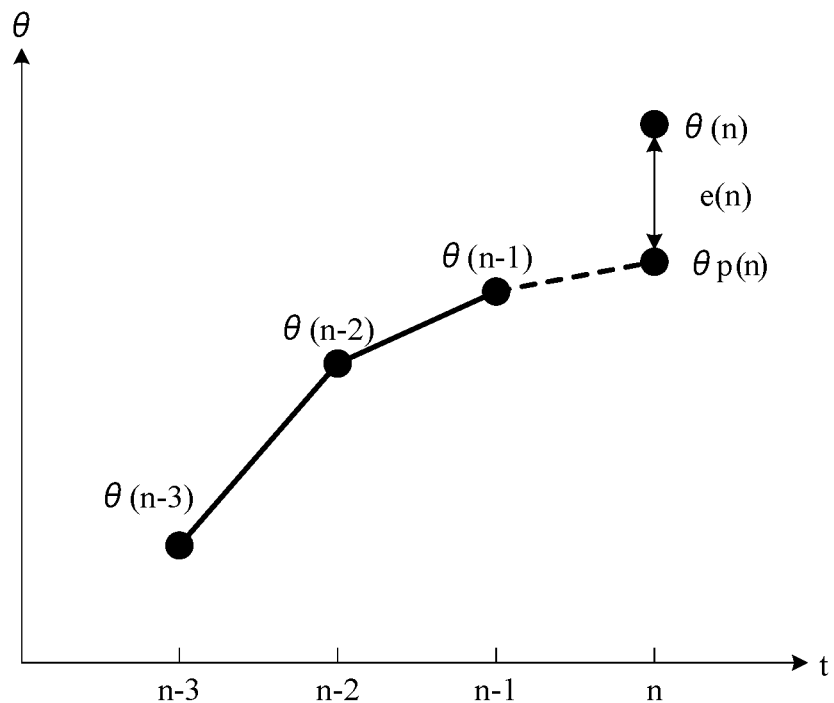
FIG. 3 is a diagram for explaining a variation in steering angle of a vehicle.

FIG. 3 is a diagram for explaining a variation in the steering angle θ of the vehicle. In a state where the vehicle is driving in a stable state, steering is smoothly performed without shaking, and a variation in the steering angle θ is small. On the other hand, in a state where the vehicle is driving in an unstable state, steering is shaking, and a variation in the steering angle θ is large. The α value calculation unit 15 calculates an α value that is an evaluation value indicating characteristics of steering by the driver of the vehicle based on the travel data in the no-load/low-load section acquired by the information acquisition unit 13 (for example, travel data of the entire section).

More specifically, as illustrated in FIG. 3, based on actual steering angles θ(n−3), θ(n−2), and θ(n−1) at time points n−3, n−2, and n−1 immediately before a specific time point n, a predicted steering angle θp(n) at the time point n is calculated by second-order Taylor expansion centered on the time point (n−1). Since the predicted steering angle θp(n) is a value estimated on the assumption that steering is performed smoothly, the predicted steering angle θp(n) matches an actual steering angle θ(n) when actual steering is performed smoothly, and deviates from the actual steering angle θ(n) according to a degree of shaking when the actual steering is shaking. Such a degree of shaking can be expressed as a predicted error e(n) calculated by the following equation (i).

$$e(n)=\theta(n)-\theta p(n) \quad (i)$$

Figure 4:
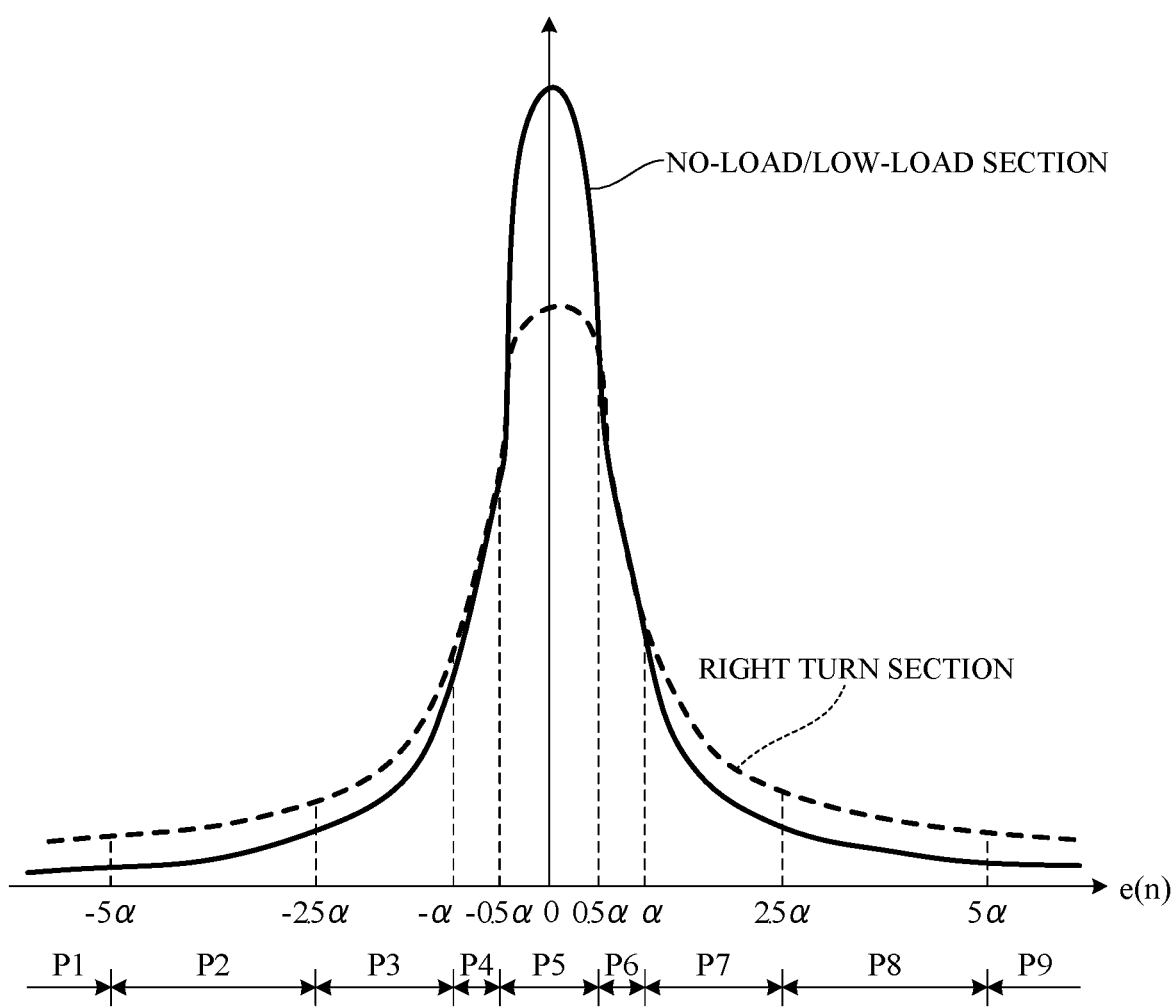
FIG. 4 is a diagram exemplifying a degree of shaking of steering expressed in frequency.

FIG. 4 is a diagram exemplifying a degree of shaking of steering expressed in frequency, and illustrates an example of a predicted error e(n) expressed in frequency. The α value calculation unit 15 calculates a predicted steering angle θp(n) and a predicted error e(n) at each time point n based on the travel data in the no-load/low-load section, and calculates a 90th percentile value (α value) in a frequency distribution of the predicted error e(n) as indicated by the solid line in FIG. 4. As steering is smoother and shaking of steering is smaller, the frequency distribution of the predicted error e(n) has a sharper shape centered on "0°" with no shaking of steering, and the α value is smaller. On the other hand, as shaking of steering is larger, the frequency distribution of the predicted error e(n) has a broader shape and the α value is larger. By using the travel data in the no-load/low-load section excluding a high-load section in which a large amount of steering is required and a driving skill largely affects shaking of steering, the α value indicating shaking of steering of the driver in a normal state can be appropriately calculated.

The Hp value calculation unit 16 calculates an Hp value indicating characteristics of steering by the driver of the vehicle based on the α value calculated by the α value calculation unit 15 and travel data in the right turn section as a predetermined section in the no-load/low-load sections used for calculation of the α value. More specifically, the Hp value calculation unit 16 calculates a predicted steering angle $\theta p(n)$ and a predicted error e(n) at each time point n based on the travel data in the right turn section, and then divides a frequency distribution of the predicted error e(n) as indicated by the broken line in FIG. 4 into nine ranges P1 to P9 based on the α value. That is, based on eight reference values $-5\alpha$, $-2.5\alpha$, $-\alpha$, $-0.5\alpha$, $0.5\alpha$, $\alpha$, $2.5\alpha$, and $5\alpha$, the Hp value calculation unit 16 divides the frequency distribution of the predicted error e(n) into nine ranges P1 ($-5\alpha$ or less), P2 ($-5\alpha$ to $-2.5\alpha$), P3 ($-2.5\alpha$ to $-\alpha$), P4 ($-\alpha$ to $-0.5\alpha$), P5 ($-0.5\alpha$ to $0.5\alpha$), P6 ($0.5\alpha$ to $\alpha$), P7 ($\alpha$ to $2.5\alpha$), P8 ($2.5\alpha$ to $5\alpha$), and P9 ($5\alpha$ or more). Then, the Hp value calculation unit 16 calculates a steering entropy value (Hp value) by the following equation (ii) based on ratios p1 to p9 of the ranges P1 to P9.

$$Hp = -\Sigma pi \cdot \log_9 pi \quad \text{(ii)}$$

The Hp value indicates smoothness of steering, is a smaller value as a frequency distribution of the predicted error e(n) is sharper with less shaking of steering, and is a larger value as the frequency distribution of the predicted error e(n) is broader with more shaking of steering. By using the travel data in the right turn section in which a line of sight shifts a large number of times and a cognitive function largely affects shaking of steering, it is possible to appropriately calculate an Hp value indicating shaking of steering of the driver in a state where a higher cognitive load is applied than that in a normal state.

The cognitive function evaluation unit 17 evaluates a cognitive function of the driver of the vehicle based on the Hp value calculated by the Hp value calculation unit 16. That is, by continuously monitoring the Hp value indicating shaking of steering in a state where the cognitive load is applied, it is possible to evaluate that the cognitive function of the driver tends to decrease. For example, when an Hp value calculated for each lecture based on travel data in an elderly person's lecture that is periodically performed tends to increase, it is evaluated that the cognitive function tends to decrease. A score of a cognitive function test in the elderly person's lecture may be considered. A similar evaluation may be performed based on an Hp value that is periodically calculated based on travel data of routine driving.

The information output unit 18 transmits a result of evaluation by the cognitive function evaluation unit 17 to a user terminal of the driver himself/herself, his/her family, or the like. For example, a notification can be transmitted to an e-mail address registered in advance. In this case, with the notification as a trigger, the driver himself/herself, his/her family, or the like can consider return of a driver's license, replacement with a vehicle having enhanced driving support functions, or the like. Since objective information based on the travel data is provided, it is easy for the driver to accept a current state of his/her cognitive function, and the driver can consider an appropriate response at an early stage.

Figure 5:
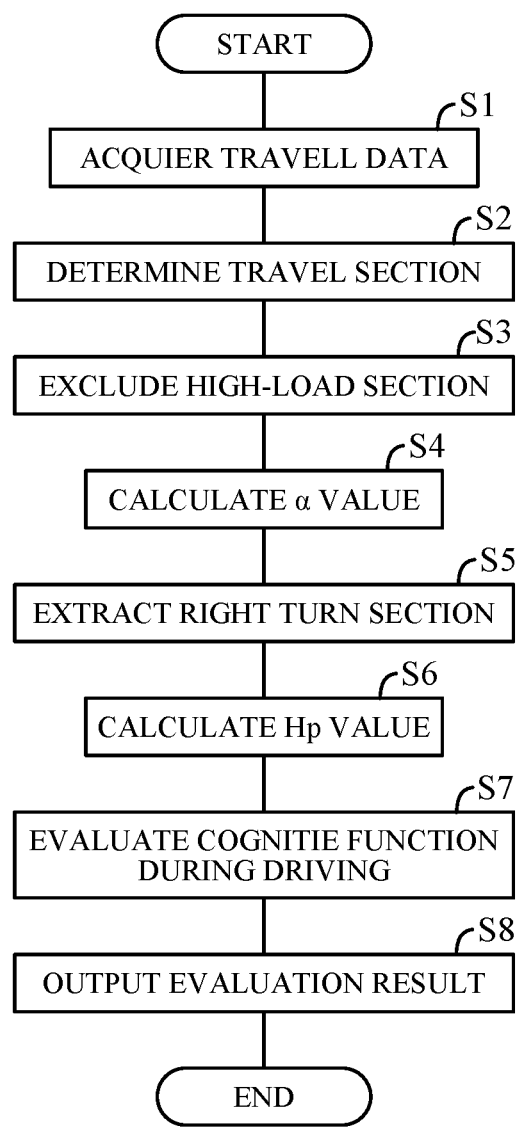
FIG. 5 is a flowchart explaining a flow for processing by an arithmetic unit of FIG. 2.

FIG. 5 is a flowchart explaining a flow for processing by the arithmetic unit 11 of the system 10. The processing illustrated in the flowchart is executed, for example, each time travel data at the time of the elderly person's lecture is input to the system 10. First, in step S1, time-series travel data is acquired. Next, in step S2, a travel section for each unit time is determined. Next, in step S3, travel data in a period determined to be a high-load section in step S2 is excluded from the travel data acquired in step S1, the process proceeds to step S4, and an α value is calculated. The latest a value calculated in step S4 is stored in the storage unit 12 and updated.

Next, in step S5, travel data in a period determined to be a right turn section in step S2 is extracted from the travel data acquired in step S1, the process proceeds to step S6, and an Hp value is calculated based on the latest a value stored in the storage unit 12. The latest Hp value calculated in step S6 is stored in the storage unit 12, and accumulated. Next, in step S7, the latest Hp value stored in the storage unit 12 is compared with past Hp values to determine a driving ability related to the cognitive function of the driver. Next, in step S8, an evaluation result of step S7 is transmitted to a mail address registered in advance, and the process ends.

As described above, since evaluation is performed based on routine travel data such as travel data at the time of the elderly person's lecture, it is possible to determine a driving ability of the driver of the vehicle without hindering driving (step S1). In addition, by excluding a high-load section in which a driving skill largely affects shaking of steering, the α value indicating shaking of steering of the driver in a normal state can be accurately calculated (steps S2 to S4). Furthermore, by using travel data in a section in which a cognitive function largely affects shaking of steering, it is possible to accurately calculate an Hp value indicating shaking of steering of the driver in a state where a higher cognitive load is applied than that in a normal state (steps S2, S5, and S6). In addition, since the cognitive function of the driver is automatically evaluated based on travel data, and the driver himself/herself or his/her family is notified of an evaluation result, it is possible to reduce a watching burden on a family living apart from an elderly person who drives the vehicle (steps S1 to S8).

According to the present embodiment, the following operations and effects are achievable.

(1) A system 10 includes: an information acquisition unit 13 that acquires travel data of a vehicle; an α value calculation unit 15 that calculates an α value indicating characteristics of steering by a driver of the vehicle based on travel data acquired by the information acquisition unit 13; and an Hp value calculation unit 16 that calculates an Hp value indicating characteristics of steering by the driver of the vehicle based on travel data in a predetermined section (for example, a right turn section) among pieces of the travel data acquired by the information acquisition unit 13 (FIG. 2). The α value calculation unit 15 calculates an α value based on the travel data in the predetermined section and travel data in a no-load/low-load section (for example, a straight line section, a curve section, a lane change section, or a left turn section) different from the predetermined section among pieces of the travel data acquired by the information acquisition unit 13.

As a result, since the α value and the Hp value, which are indices for determining a driving ability of the driver, can be calculated based on routine travel data such as travel data at the time of an elderly person's lecture, the driving ability can be determined without hindering driving.

(2) The predetermined section is at least one of a section in which the number of times a line of sight shifts during travel is larger than a predetermined number, a section in which a traffic light is disposed, a section in which the number of pedestrians is larger than a predetermined number, a section in which the number of blind spots during driving is larger than a predetermined number, and a section in which a plurality of roads intersect. By using such travel data in a section in which a cognitive function largely affects shaking of steering, it is possible to accurately calculate an Hp value indicating shaking of steering of the driver in a state where a higher cognitive load is applied than that in a normal state, and to accurately determine the driving ability related to the cognitive function.

(3) The predetermined section and the no-load/low-load section different from the predetermined section are travel sections without S-curve travel, crank travel, or parking travel (FIG. 1). In a high-load section with such travel, a frequency of steering is high, it is necessary to operate steering in cooperation with an operation of an accelerator or a brake, and a vehicle sense is also required. Thus, a driving skill more largely affects shaking of steering rather than the cognitive function. By excluding travel data in such a high-load section, an α value indicating shaking of steering of the driver in a normal state can be accurately calculated.

(4) The predetermined section is a section in which a traveling direction of the vehicle is changed by crossing an opposite lane at an intersection, and a right turn section in a country or a region where left-hand traffic of the vehicle is adopted (FIG. 1). In the right turn section, when a target track of the vehicle is recognized, a shift of a line of sight between an opposite lane ahead and a travel lane after turning right increases the driver's mental activity and a cognitive load applied to the driver. As a result, shaking of steering is larger than that in another travel section. By using travel data in such a right turn section, an Hp value indicating shaking of steering of the driver in a state where a larger cognitive load is applied than in a normal state can be accurately calculated.

(5) The system 10 further includes a cognitive function evaluation unit 17 that evaluates a cognitive function of the driver of the vehicle based on an Hp value calculated by the Hp value calculation unit 16 (FIG. 2). For example, travel data of an individual driver is periodically acquired and an Hp value is calculated for each elderly person's lecture, and when an increasing tendency is observed in the Hp value, it can be evaluated that the cognitive function is decreasing. As described above, by continuously monitoring a change in the cognitive function using routine travel data, it is possible to grasp a decrease tendency of the cognitive function at an early stage before a specific event such as an accident occurs. In addition, by grasping the decrease tendency of the cognitive function at an early stage, it is possible to review an overall life other than driving of the vehicle, leading to maintenance and recovery of the cognitive function.

(6) The system 10 further includes an information output unit 18 that outputs an evaluation result by the cognitive function evaluation unit 17 (FIG. 2). For example, a notification can be transmitted to an e-mail address of a driver himself/herself or his/her family registered in advance. In this case, with the notification as a trigger, return of a driver's license, replacement with a vehicle having enhanced driving support functions, or the like can be considered. As described above, since objective information based on the travel data is provided, it is easy for the driver to accept the current state of his/her cognitive function, and the driver can consider an appropriate response at an early stage.

In the above embodiment, the example of continuously monitoring travel data of a specific driver has been described, but a method for determining a driving ability of the driver of the vehicle is not limited to such a method. For example, the driving ability related to the cognitive function may be determined by comparison with a predetermined reference value such as an average value for a plurality of drivers who have taken an elderly person's lecture.

Although the present invention has been described above as a driving ability determination system, the present invention can also be used as a driving ability determination method. That is, the driving ability determination method includes: travel data acquisition steps S1 to S3 for acquiring travel data of a vehicle; an α value calculation step S4 for calculating an αvalue indicating characteristics of steering by a driver of the vehicle based on the travel data acquired in the travel data acquisition steps S1 to S3; and Hp value calculation steps S5 and S6 for calculating an Hp value indicating characteristics of steering by the driver of the vehicle based on travel data in a predetermined section among pieces of the travel data acquired in the travel data acquisition step S1 (FIG. 5). In the α value calculation step S4, an α value is calculated based on the travel data in the predetermined section and travel data in a no-load/low-load section different from the predetermined section among pieces of the travel data acquired in the travel data acquisition steps S1 to S3.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 10 driving ability determination system (system), 11 arithmetic unit, 12 storage unit, 13 information acquisition unit, 14 section determination unit, 15 αvalue calculation unit, 16 Hp value calculation unit, 17 cognitive function evaluation unit, 18 information output unit.

The invention claimed is:

1. A driving ability determination system, comprising:
a processor and a memory coupled to the processor, wherein
the processor is configured to perform:
acquiring travel data of a vehicle;
calculating a first evaluation value indicating shaking of steering by a driver of the vehicle based on the travel data;
calculating a second evaluation value indicating shaking of steering by the driver of the vehicle based on the travel data in a first section among pieces of the travel data;
evaluating a cognitive function of the driver based on the first evaluation value and the second evaluation value; and
outputting an evaluation result of the cognitive function to a user terminal, wherein
the calculating the first evaluation value includes calculating the first evaluation value based on the travel data in the first section and the travel data in a second section different from the first section among the pieces of the travel data.

2. The driving ability determination system according to claim 1, wherein
the first section is at least one of: a section in which a number of times a line of sight shifts during travel is larger than a predetermined number; a section in which a traffic light is disposed; a section in which a number of pedestrians is larger than a predetermined number; a section in which a number of blind spots during driving is larger than a predetermined number; and a section in which a plurality of roads intersect.

3. The driving ability determination system according to claim 1, wherein
the first section and the second section are travel sections without S-curve travel, crank travel, or parking travel.

4. The driving ability determination system according to claim 1, wherein
the first section is a section in which a traveling direction of the vehicle is changed by crossing an opposite lane at an intersection.

5. The driving ability determination system according to claim 4, wherein
the first section is a left turn section.

6. The driving ability determination system according to claim 1, wherein
the processor is configured to perform:
the evaluating comprising evaluating that the cognitive function of the driver tends to decrease.

7. The driving ability determination system according to claim 1, wherein
the processor is configured to perform:
the outputting comprising transmitting a notification to an email address registered in advance.

8. A driving ability determination method, comprising the steps of:
acquiring travel data of a vehicle;
calculating a first evaluation value indicating shaking of steering by a driver of the vehicle based on the travel data;
calculating a second evaluation value indicating shaking of steering by the driver of the vehicle based on the travel data in a first section among pieces of the travel data;
evaluating cognitive function of the driver based on the first evaluation value and the second evaluation value; and
outputting an evaluation result of the cognitive function to a user terminal, wherein
the calculating the first evaluation value includes calculating the first evaluation value based on the travel data in the first section and the travel data in a second section different from the first section among the pieces of the travel data.

9. The driving ability determination method according to claim 8, wherein
the first section is at least one of: a section in which a number of times a line of sight shifts during travel is larger than a predetermined number; a section in which a traffic light is disposed; a section in which a number of pedestrians is larger than a predetermined number; a section in which a number of blind spots during driving is larger than a predetermined number; and a section in which a plurality of roads intersect.

10. The driving ability determination method according to claim 8, wherein
the first section and the second section are travel sections without S-curve travel, crank travel, or parking travel.

11. The driving ability determination method according to claim 8, wherein
the first section is a section in which a traveling direction of the vehicle is changed by crossing an opposite lane at an intersection.

12. The driving ability determination method according to claim 11, wherein
the first section is a left turn section.

13. The driving ability determination method according to claim 8, wherein:
the evaluating comprises evaluating that the cognitive function of the driver tends to decrease.

14. The driving ability determination method according to claim 8, wherein:
the outputting comprises transmitting a notification to an email address registered in advance.

* * * * *